US009288054B2

United States Patent
Han et al.

(10) Patent No.: US 9,288,054 B2
(45) Date of Patent: Mar. 15, 2016

(54) METHOD AND APPARATUS FOR AUTHENTICATING AND MANAGING APPLICATION USING TRUSTED PLATFORM MODULE

(71) Applicant: Electronics and Telecommunications Research Institute, Daejeon (KR)

(72) Inventors: Jin-Hee Han, Daejeon (KR); Bo-Heung Chung, Daejeon (KR); Dae-Won Kim, Daejeon (KR); Hwa-Shin Moon, Daejeon (KR); Yong-Hyuk Moon, Daejeon (KR); Jeong-Nyeo Kim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 14/222,980

(22) Filed: Mar. 24, 2014

(65) Prior Publication Data

US 2015/0113272 A1    Apr. 23, 2015

(30) Foreign Application Priority Data

Oct. 21, 2013  (KR) .................. 10-2013-0125490

(51) Int. Cl.
| | |
|---|---|
| *H04L 9/08* | (2006.01) |
| *H04L 9/38* | (2006.01) |
| *H04L 9/32* | (2006.01) |
| *G06F 21/00* | (2013.01) |
| *G06F 21/44* | (2013.01) |

(52) U.S. Cl.
CPC .............. *H04L 9/3239* (2013.01); *G06F 21/00* (2013.01); *G06F 21/44* (2013.01)

(58) Field of Classification Search
CPC ...................... G06F 21/335; H04L 63/0807
USPC ........... 713/168, 153, 155, 178; 726/2, 17, 26
See application file for complete search history.

(56) References Cited

U.S. PATENT DOCUMENTS

| | | | |
|---|---|---|---|
| 8,881,257 B2 * | 11/2014 | Cha et al. ........................ 726/10 |
| 8,990,574 B1 * | 3/2015 | Priyadarshi ......... H04L 63/0823 |
| | | | 713/176 |

(Continued)

FOREIGN PATENT DOCUMENTS

KR    10-2014-0015105    2/2014

OTHER PUBLICATIONS

"Using the TPM: Data Protection and Storage"—Ariel Segall, MIT Univ. of Science, Dec. 2010 http://opensecuritytraining.info/IntroToTrustedComputing_files/Day2-2-data-storage.pdf.*

*Primary Examiner* — Randy Scott
(74) *Attorney, Agent, or Firm* — Staas & Halsey LLP

(57) ABSTRACT

Disclosed herein are authentication and management of an application using a mobile trusted module (MTM).
According to an exemplary embodiment of the present invention, there is provided an apparatus for authenticating and managing an application, including: a mobile trusted module configured to store a hash value of an authentication data for at least one application and a secret key value of an authentication data which are installed in a mobile device, authenticate the application using the stored hash value and secret key value of the authentication data, and generate a storage root key (SRK) for the application; and a trusted software stack (TSS) middleware configured to generate a message requesting authentication for the application and generation of the storage root key (SRK) and transmit the generated message to the mobile trusted module and manage result information received from the mobile trusted module in response to the transmitted message.

13 Claims, 2 Drawing Sheets

(56) References Cited

U.S. PATENT DOCUMENTS

| | | | |
|---|---|---|---|
| 2006/0135121 A1* | 6/2006 | Abedi et al. | 455/410 |
| 2007/0174490 A1* | 7/2007 | Choi et al. | 709/246 |
| 2010/0042824 A1* | 2/2010 | Lee et al. | 713/2 |
| 2010/0306819 A1* | 12/2010 | Nahari et al. | 726/2 |
| 2014/0033318 A1 | 1/2014 | Han et al. | |
| 2014/0043141 A1* | 2/2014 | Cazanas | G06F 21/35 340/5.81 |

* cited by examiner

METHOD AND APPARATUS FOR AUTHENTICATING AND MANAGING APPLICATION USING TRUSTED PLATFORM MODULE

CROSS REFERENCE TO RELATED APPLICATION

This application claims the benefit of Korean Patent Application No. 10-2013-0125490, filed on Oct. 21, 2013, entitled "Method and Apparatus for Authenticating and Managing Application Using Trusted Platform Module", which is hereby incorporated by reference in its entirety into this application.

BACKGROUND OF THE INVENTION

1. Technical Field

The present invention relates to authentication and management of an application using a mobile trusted module (MTM), and more particularly, to a method and an apparatus for safely authenticating an application installed in a mobile device using a mobile trusted module mounted in the mobile device and managing data and key values generated by the authenticated application depending on independent key management systems for each application.

2. Description of the Related Art

Recently, as security threats to various types of mobile devices, and the like, including a computer system are suddenly increased, solutions thereto have been searched and developed at different angles. Among the solutions, a software security scheme has been mainly used. In actual, the software security scheme has a disadvantage in that when a memory stored with user data is lost or maliciously hacked from the outside, personal data stored in the memory are completely leaked. Further, the existing security scheme has a disadvantage in that since an encryption key may be easily exposed to the outside, any function of protecting the mobile device from hacking may not be provided.

As a scheme to solve the problems of the software security scheme, a security scheme using hardware has been proposed. One of the security schemes using hardware is the very trusted platform module (hereinafter, referred to as 'TPM') chip of a trusted computing group (hereinafter, referred to as 'TCG'). The TPM chip provides an encryption engine while providing an independent storage space in which key values, a password, a digital certificate, and the like may be stored. That is, when the TPM chip is manufactured, an endorsement key (EK) which is a unique key is allocated and a storage root key (SRK) is generated by an ownership acquiring process, in which the key values are set not to be able to be leaked outside the chip. Therefore, the TPM chip may supplement various vulnerabilities of the existing software security scheme due to characteristics of the TPM, and thus tends to have recently received attention from users and the persons concerned. The TCG has also proposed the mobile trusted module (MTM) chip which is appropriate for the mobile mobile device, in addition to the TPM chip developed to be appropriate for PC environment and the MTM chip additionally provides various types of security functions required for mobile environment while adopting some of the security functions provided by the TPM chip.

Since the MTM is mounted in the mobile device to provide platform integrity verification for the mobile device itself, a safe key management system, a physical safety function, and the like, the MTM has a good environment in which authentication and key information of the application may be safely processed and managed.

SUMMARY OF THE INVENTION

The present invention has been made in an effort to provide a method and an apparatus for authenticating an application installed in a mobile device using a mobile trusted module (MTM).

Further, the present invention has been made in an effort to provide a method and an apparatus for independently operating key management systems for each application by generating and managing root keys (for example, $SRK_{app1}$, $SRK_{app2}$, etc.) for each application using a mobile trusted module (MTM).

According to an exemplary embodiment of the present invention, there is provided a method for authenticating an application using a mobile trusted module included in a mobile device. The method for authenticating an application using a mobile trusted module included in a mobile device includes: extracting an encrypted hash value of an authentication data from an installation file of the application when the application is installed in the mobile device; generating an application authentication request message including the extracted encrypted hash value of the authentication data and identification information on the application and transmitting the generated application authentication request message to the mobile trusted module; and receiving and storing an authentication result for the application from the mobile trusted module.

According to another exemplary embodiment of the present invention, there is provided a method for managing an application using a mobile trusted module included in a mobile device. The method for managing an application using a mobile trusted module included in a mobile device includes: receiving a storage root key (SRK) generation request from the application which is installed in the mobile device; generating an application SRK generation request message including identification information on the application and transmitting the generated application SRK generation request message to the mobile trusted module; and receiving and storing SRK generation result information on the application from the mobile trusted module, wherein the generated SRK is used to safely store at least some of data and key values which are generated only by the application.

According to still another exemplary embodiment of the present invention, there is provided an apparatus for authenticating and managing an application, including: a mobile trusted module configured to store a hash value of an authentication data for at least one application and a secret key value of an authentication data which are installed in a mobile device, authenticate the application using the stored hash value and secret key value of the authentication data, and generate a storage root key (SRK) for the application; and a trusted software stack (TSS) middleware configured to generate a message requesting authentication for the application and generation of the storage root key (SRK) and transmit the generated message to the mobile trusted module and manage result information received from the mobile trusted module in response to the transmitted message.

DESCRIPTION OF EXEMPLARY EMBODIMENTS

The present invention may be variously modified and have several exemplary embodiments. Therefore, specific exemplary embodiments of the present invention will be illustrated in the accompanying drawings and be described in detail in the present specification. However, it is to be understood that the present invention is not limited to a specific exemplary embodiment, but includes all modifications, equivalents, and substitutions without departing from the scope and spirit of the present invention.

Further, when it is determined that the detailed description of the known art related to the present invention may obscure the gist of the present invention, the detailed description thereof will be omitted.

A singular form used in the present description and the following claims is to be interpreted to generally mean "one or more" unless mentioned to the contrary.

Further, "module", "part", "interface", and the like, among terms used in the present specification generally means computer-related objects, for example, hardware, software, and a combination thereof.

Further, a "mobile device" mentioned in the present specification may correspond to a cellular phone, a smart phone, a laptop computer, digital broadcasting portable electronic devices, personal digital assistants (PDAs), a portable multimedia player (PMP), a navigation, and the like, but is not limited thereto and therefore the mobile device may be any electronic device including a mobile trusted module chip.

Further, an "application" mentioned in the present specification means an application using a security function which is provided by a mobile trusted module.

Figure 1:
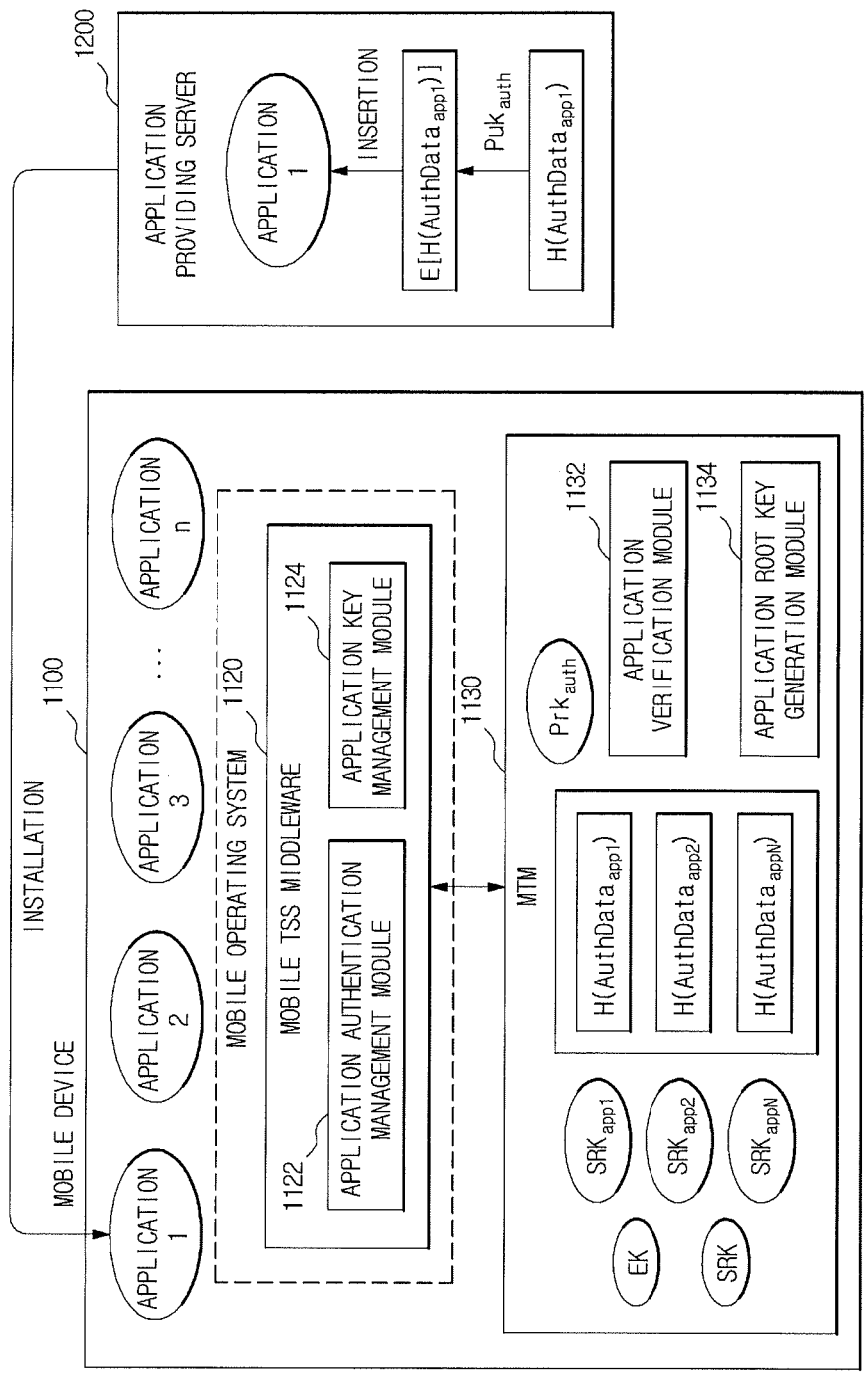
FIG. 1 is a block diagram illustrating a configuration of a mobile device for authenticating and managing an application according to an exemplary embodiment of the present invention.

FIG. 1 is a block diagram illustrating a configuration of a mobile device for authenticating and managing an application according to an exemplary embodiment of the present invention. FIG. 1 illustrates only one application providing server 1200 providing an application to the mobile device 1100, for convenience of explanation; however, one or more application provided by a plurality of different application providing servers may be installed in the mobile device 1100.

According to the exemplary embodiment of the present invention, the application providing server 1200 generates a hash value $H(AuthData_{app1})$ of an authentication data for authenticating the application and inserts an encrypted hash value $E[H(AuthData_{app1})]$ of an authentication data into an installation file of the application using a public key $Puk_{auth}$ for authentication data. For example, to authenticate an application 1, a hash value $AuthData_{app1}$ of an authentication data is generated and the hash value of the authentication data is encrypted using the public key $Puk_{auth}$ for authentication data and is then inserted into the installation file of the application 1.

A pair of secret key $Prk_{auth}$ and public key $Puk_{auth}$ which is used to encrypt and decrypt the authentication data for the application is safely generated and managed by a mobile device manufacturer or a common carrier. The secret key $Prk_{auth}$ for an authentication data is stored in a mobile trusted module (MTM) 1130 of the mobile device 1100 by the mobile device manufacturer or the common carrier using various schemes and the public key $Puk_{auth}$ for authentication data and an authentication data generation tool are distributed to an application service provider to be available. When the authentication data generation tool is distributed to the application service provider, identification data for internally identifying the service provider are set and distributed and may be used by only the service provider to which the use authority is granted. The mobile trusted module and the application service provider may own the same authentication data using the authentication data generation tool. The mobile device manufacturer or the common carrier generates the hash value of the authentication data for the application using the authentication data generation tool and then stores the generated hash value of the authentication data in the mobile trusted module (MTM) 1130 of the mobile device 1100. The authentication data may be safely shared and managed by the mobile device manufacturer or the common carrier and the application service provider using various schemes.

Referring to FIG. 1, the mobile device 1100 according to the exemplary embodiment of the present invention may include the mobile trusted module (MTM) 1130 and a mobile trusted software stack (TSS) middleware 1120 which is executed on a mobile operating system and perform a message exchange with the MTM 1130. In addition to components illustrated in FIG. 1, the mobile device 1100 includes various components, such as a memory, a processor, wired/wireless communications, and a user interface, but to help understanding of the present invention, the fact that these components are not illustrated in FIG. 1 may be sufficiently understood by a person having ordinary skill in the art to which the present invention pertains.

Basically, the MTM 1130 provides platform integrity verification for the mobile device itself, a guarantee function, and a local verification function and has a shielded location, protected capabilities, a safe key management system, and physical safety. However, the MTM has a limited internal memory size, and thus generates a storage root key (SRK) in an MTM internal memory and then operates the key management system using the generated storage root key as a root on a mobile device platform, and the applications use their own service IDs to use the same key management system provided from the mobile device platform. However, when the application and the number of keys used in the application are gradually increased, a key management system hierarchical structure may be complicated, an execution delay time may occur at the time of loading and storing the keys, and since one key management system is used along with various types of applications, safety of all the security services when the key management system is attacked from the outside may not be provided.

To solve the problems, the MTM 1130 according to the exemplary embodiment of the present invention may store the secret key values of the authentication data and the hash values of the authentication data for each application in the internal memory (not illustrated) and may authenticate the applications using the hash values and secret key values of the authentication data and generate the storage root keys (SRKs) for each application.

According to the exemplary embodiment of the present invention, the secret key values of the authentication data and the hash values of the authentication data for each application which are stored in the internal memory (not illustrated) may be provided by a common carrier or a mobile device manufacturer using various schemes. Further, an endorsement key (EK) which is a unique key allocated when the corresponding MTM is manufactured and the storage root key (SRK) generated through an ownership acquiring process may also be stored in the internal memory of the MTM 1130.

According to the exemplary embodiment of the present invention, the MTM 1130 may include an application verification module 1132 and an application root key generation module 1134.

When receiving an application authentication request message from a mobile TSS middleware 1120, the application verification module 1132 uses the security key for authentication data to decrypt the encrypted hash value of authentication data included in the message and compares the decrypted hash value of authentication data with the prestored hash value of the authentication data for the application to be able to perform the verification for the application. When a result value obtained by decrypting the hash value of authentication data for the corresponding application coincides with the hash value of authentication data for the application stored in the internal memory, the application verification module 1132 informs an application authentication management module 1122 of the mobile TSS middleware 1120 that the authentication for the application is successfully completed and the application authentication management module 1122 safely manages authentication results for each of the applications. On the other hand, when the decrypted result value does not coincide with the hash value of authentication data for the application stored in the internal memory, the installation of the application stops and the failure of the authentication is informed to the application authentication management module 1122 of the mobile TSS middleware 1120.

When an application authenticating process is completed, the mobile operating system verifies the integrity of the application file to complete the installation of the application when the verification result is normal. In this case, an integrity verifying process may be performed using a reference integrity metric (RIM) certificate as specified in a standard of the MTM 1130, but may be performed using the method used in an authentication data verifying process according to the exemplary embodiment of the present invention as described above. That is, an integrity information value of the application is encrypted using the public key $Puk_{auth}$ for authentication data, decrypted using the secret key $Prk_{auth}$ for authentication data stored in the MTM 1130, and then compares with an integrity value measured by the mobile operating system, thereby performing the verification. To this end, an integrity data verification module (not illustrated) and an integrity data management module (not illustrated) of an application may be additionally included in an MTM (1130).

After the authentication or the integrity verification is successfully completed, the applications for operating the independent key management systems may request a generation of a root key $SRK_{app1}$ for safely storing and managing data which are to be used by the MTM 1130. The root key $SRK_{app1}$ is a key value which is first generated and is safely stored within the MTM 1130 to safely store and manage critical data and key values, which are internally used by the application, in the mobile TSS middleware 1120. As two authentication data values required as an input to generate the root key $SRK_{app1}$, in the present invention, the hash value of the secret key $Prk_{auth}$ for the authentication data and the hash value of the authentication data for an application are used. That is, the hash value of the secret key $Prk_{auth}$ for the authentication data may be used as a user password and the hash value of the authentication data for the application may be used as a root key generation password.

According to the exemplary embodiment of the present invention, when the application root key generation module 1134 receives the application root key generation request message from the TSS middleware 1120, the root key $SRK_{app1}$ for the corresponding application is generated by using the hash value of the authentication data for the corresponding application stored in the internal memory and the result value obtained by hashing the secret key for authentication data and is safely stored in the internal memory. When all the root key $SRK_{app1}$ generation request processes for the application are completed, the application root key generation module 1134 transmits the processed result to the application key management module 1124 of the mobile TSS middleware 1120 and the application key management module 1124 stores the root key generation result information on the applications operating the independent key management systems and then safely manages the key management system for the corresponding application on the mobile device platform. The root key $SRK_{app1}$ has a key feature similar to the SRK which is generated by the ownership acquiring process specified in the standard of the MTM 1130 and is stored and managed and is used only for a safe storage and management function of the critical data and the key values of the applications. Only the application service provider may have the management authority of the generation, discard, and the like of the root key $SRK_{app1}$. As a result, the application service provider and the mobile device manufacturer/common carrier may more conveniently and safely authenticate the application by using the MTM which provides the physical safety and various security functions and may receive more improved performance and safety than the existing scheme by independently managing the key management systems for each application.

According to the exemplary embodiment of the present invention, when the application is installed in the mobile device, the TSS middleware 1120 may include an application authentication management module 1122 which generates the authentication request message for the application and transmits the generated authentication request messages to the MTM 1130 and the application key management module 1124 which generates the storage root key (SRK) generation request message for the installed application and transmits the generated storage root key (SRK) generation request message to the MTM 1130.

The application authentication management module 1122 extracts the encrypted hash value of the authentication data from the installation file of the application and generates the application authentication request message including the extracted encrypted hash value of the authentication data and the identification information on the application and transmits the application authentication request message to the MTM 1130. Further, the application authentication management module 1122 may receive and store the authentication result depending on a response to the application authentication request message from the MTM 1130.

The application key management module 1124 may generate the application SRK generation request message including the identification information on the application and transmit the generated application SRK generation request message to the MTM 1130 and receive and store the SRK generation result information on the application from the MTM 1130.

Figure 2:
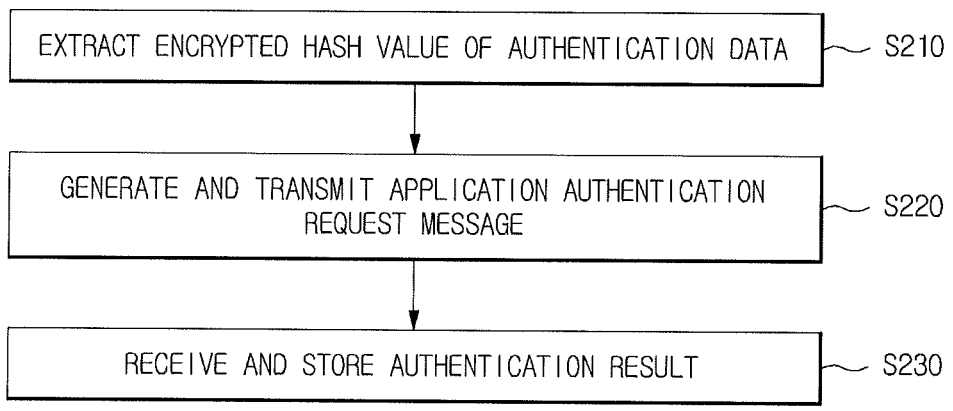
FIG. 2 is a flow chart illustrating a method for authenticating an application using a mobile trusted module according to an exemplary embodiment of the present invention.

FIG. 2 is a flow chart illustrating a method for authenticating an application using a mobile trusted module according to an exemplary embodiment of the present invention.

According to the exemplary embodiment of the present invention, a process of authenticating an application is automatically executed when the corresponding application is installed in the mobile device.

In step S210, when the application is installed in the mobile device, the encrypted hash value of the authentication data is extracted from the installation file of the application.

According to the exemplary embodiment of the present invention, the encrypted hash value of the authentication data is a value generated by the corresponding application service provider by using the public key for authentication data and the authentication data generation tool which are distributed by the common carrier or the mobile device manufacturer. The public key for the authentication data and the secret key corresponding thereto and the hash value of the authentication data for the application are generated and managed by the mobile device manufacturer or the common carrier. The public key is distributed to the application provider and the secret key and the hash value of the authentication data are stored in the internal memory of the mobile trusted module by the mobile device manufacturer or the common carrier. The application service provider generates the hash value of the authentication data for the application using the authentication data generation tool, encrypts the hash value using the public key for the authentication data, and then inserts the encrypted hash value into the installation file of the application.

In step S220, the application service provider generates the application authentication request message including the encrypted hash value of the authentication data extracted from the installation file of the application and the identification information on the corresponding application and transmits the generated application authentication request message to the mobile trusted module.

The mobile trusted module receiving the application authentication request message decrypts the encrypted hash value of the authentication data included in the message using the secret key for the authentication data for the application and compares the decrypted hash value of the authentication data with the pre-stored hash value of the authentication data for the application to be able to perform the authentication for the application. When the hash value of the authentication data decrypted by the mobile trusted module does not coincide with the pre-stored hash value of the authentication data, the installation of the application may stop.

In step S230, the authentication result for the application is received and stored from the mobile trusted module.

Figure 3:
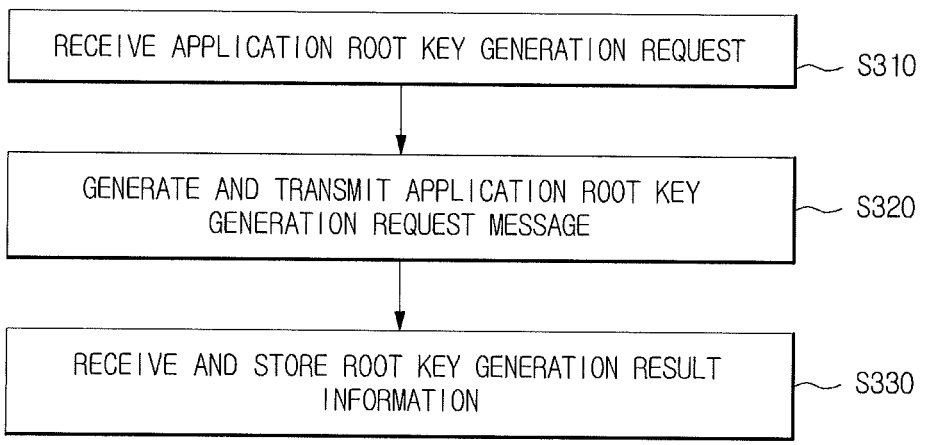
FIG. 3 is a flow chart illustrating a method for managing an application using a mobile trusted module according to an exemplary embodiment of the present invention.

FIG. 3 is a flow chart illustrating a method for managing an application using a mobile trusted module according to an exemplary embodiment of the present invention.

In step S310, the storage root key $SRK_{app1}$ generation request for operating the independent key management systems is received from an application app1 which is installed in the mobile device and is subjected to authentication or integrity verification.

In step S320, the identification information on the application receiving the $SRK_{app1}$ generation request is figured out and the application SRK generation request message including the identification information on the selected application is generated and then is transmitted to the mobile trusted module.

The mobile trusted module receiving the application $SRK_{app1}$ generation request message may generate the $SRK_{app1}$ for the application by using the hash value of the authentication data for the application requesting the generation of the $SRK_{app1}$ stored in the internal memory of the module and the result value obtained by hashing the secret key for the authentication data.

In step S330, the SRK generation result information on the corresponding application is received and stored from the mobile trusted module. The SRK generated by the mobile trusted module is used to safely store at least some of the generated data and the key values only by the corresponding application.

According to the exemplary embodiment of the present invention, the environment in which the user may more safely and conveniently use the application may be provided by authenticating the application using the mobile trusted module.

Further, according to the exemplary embodiment of the present invention, even though the one key management system is attacked from the outside, the damage to other key management systems may be prevented by managing each of the key management systems for each application, thereby providing the safety higher than the existing scheme.

In addition, the problem of complexity and performance degradation of the key management system may be resolved.

The apparatus and the method according to the exemplary embodiment of the present invention as described above are implemented in a program command form which may be executed by various computing devices and thus may be recorded in a computer-readable medium. The computer-readable medium may include program commands, data files, a data structure, and the like, alone or a combination thereof.

The program command recorded in the computer-readable medium may be specifically designed and constituted for the present invention, or the program command known to those skilled in a field of computer software may be used. An example of the computer-readable recording medium may include magnetic media such as a hard disk, a floppy disk, and a magnetic tape, optical media such as a CD-ROM and a DVD, magneto-optical media such as a floptical disk, and hardware devices specially configured to store and run program commands such as a ROM, a RAM, and a flash memory. Further, the foregoing media may be light including a carrier transmitting signals designating the program command, the data structure, and the like, or transmission media, such as a metallic wire and a waveguide. Examples of the program commands may include machine language codes made by compilers as well as high-level language codes capable of being executed by computers using interpreters, an the like.

The foregoing hardware device may be constituted to be operated as one more software module in order to perform the operations of the present invention, and vise versa.

Hereinabove, the present invention has been described with reference to exemplary embodiments thereof. It will be understood by those skilled in the art to which the present invention pertains that the present invention may be implemented in a modified form without departing from essential characteristics of the present invention. Therefore, the exemplary embodiments disclosed herein should be considered in an illustrative aspect rather than a restrictive aspect. The scope of the present invention should be defined by the following claims rather than the above-mentioned description, and all technical spirits equivalent to the following claims should be interpreted as being included in the present invention.

What is claimed is:

1. A method for authenticating an application using a mobile trusted module included in a mobile device, the method comprising:

extracting an encrypted hash value of an authentication data from an installation file of the application when the application is installed in the mobile device, the hash value of the authentication data being generated by a mobile device manufacturer or a common carrier;

generating an application authentication request message including the extracted encrypted hash value of the authentication data and identification information on the application and transmitting the generated application authentication request message to the mobile trusted module; and receiving and storing an authentication result for the application from the mobile trusted module, wherein the encrypted hash value of the authentication data is a value obtained by encrypting the hash value of the authentication data for the application using a public key for the authentication data.

2. The method of claim 1, wherein the public key for the authentication data, a secret key corresponding thereto, and the hash value of the authentication data for the application are generated by the mobile device manufacturer or the common carrier, the public key is distributed to an application provider, the secret key and the hash value of the authentication data are stored in an internal memory of the mobile trusted module by the mobile device manufacturer or the common carrier.

3. The method of claim 2, wherein the mobile trusted module receiving the application authentication request message decrypts the encrypted hash value of the authentication data for the application using the secret key for the authentication data and compares the decrypted hash value of the authentication data with a pre-stored hash value of the authentication data for the application to perform the authentication for the application.

4. The method of claim 3, further comprising: when the decrypted hash value of the authentication data does not coincide with the pre-stored hash value of the authentication data by the mobile trusted module, stopping an installation of the application.

5. A method for managing an application using a mobile trusted module included in a mobile device, the method comprising:

receiving a storage root key (SRK) generation request from the application which is installed in the mobile device;

generating an application SRK generation request message including identification information on the application and transmitting the generated application SRK generation request message to the mobile trusted module; and receiving and storing SRK generation result information on the application from the mobile trusted module, wherein the generated SRK is used to safely store at least some of data and key values which are generated only by the application.

6. The method of claim 5, wherein the mobile trusted module generates the SRK using a hash value of an authentication data for the application stored in an internal memory of the module and a result value obtained by hashing a secret key for the authentication data.

7. The method of claim 5, wherein a secret key for the authentication data, a public key corresponding thereto, and the hash value of the authentication data for the application are generated by a mobile device manufacturer or a common carrier and the secret key and the hash value of the authentication data are stored in an internal memory of the mobile trusted module.

8. An apparatus for authenticating and managing an application, the apparatus comprising:

a mobile device having a memory and a processor coupled to the memory;

a mobile trusted module included in the mobile device and configured to store a hash value of an authentication data for at least one application and a secret key value of an authentication data which are installed in a mobile device, authenticate the application using the stored hash value and secret key value of the authentication data, and generate a storage root key (SRK) for the application, the hash value of the authentication data being generated by a mobile device manufacturer or a common carrier; and a trusted software stack (TSS) middleware configured to generate a message requesting authentication for the application and generation of the storage root key (SRK) and transmit the generated message to the mobile trusted module and manage result information received from the mobile trusted module in response to the transmitted message, wherein the mobile trusted module includes an internal memory and the internal memory stores the secret key values for the authentication data and the hash values of the authentication data for each of the at least one application.

9. The apparatus of claim 8, wherein the mobile trusted module includes an application verification module configured to decrypt an encrypted hash value of an authentication data using the secret key for the authentication data for the application and compare the decrypted hash value of the authentication data with a pre-stored hash value of the authentication data for the application to perform the authentication for the application, when the application verification module receives an application authentication request message from the TSS middleware.

10. The apparatus of claim 8, wherein the mobile trusted module includes an application root key generation module configured to use the hash value of the authentication data for the application which is stored in the internal memory of the module and a result value obtained by hashing the secret key for the authentication data for the application to generate the SRK, when the application root key generation module receives an application root key generation request message from the TSS middleware.

11. The apparatus of claim 8, wherein the TSS middleware includes:

an application authentication management module configured to generate an authentication request message for the application and transmit the generated authentication request message to the mobile trusted module when the application is installed in the mobile device, and an application management module configured to generate a storage root key (SRK) generation request message for the installed application and transmit the generated storage root key (SRK) generation request message to the mobile trusted module.

12. The apparatus of claim 11, wherein the application authentication management module extracts an encrypted hash value of the authentication data from an installation file of the application, generates an application authentication request message including the extracted encrypted hash value of the authentication data and identification information on the application and transmits the generated application authentication request message to the mobile trusted module, and receives and stores an authentication result for the application from the mobile trusted module.

13. The apparatus of claim 11, wherein the application management module generates an application SRK generation request message including the identification information on the application and transmits the generated application SRK generation request message to the mobile trusted module and receives and stores the SRK generation result information on the application from the mobile trusted module.

* * * * *